(12) United States Patent
Daniel et al.

(10) Patent No.: US 10,541,504 B2
(45) Date of Patent: Jan. 21, 2020

(54) ACTIVE OPTICAL FIBRE

(71) Applicant: COMMONWEALTH OF AUSTRALIA represented by DEPARTMENT OF DEFENSE, DEFENSE SCIENCE AND TECHNOLOGY ORGANISATION, Edinburgh (AU)

(72) Inventors: Jae Daniel, Edinburgh (AU); William Andrew Clarkson, Southampton (GB); Nikita Simakov, Edinburgh (AU)

(73) Assignee: Commonwealth Of Australia represented by Department of Defence, Defence Science and Technology Organisation, Edinburgh (AU)

( * ) Notice: Subject to any disclaimer, the term of this patent is extended or adjusted under 35 U.S.C. 154(b) by 0 days.

(21) Appl. No.: 15/550,012

(22) PCT Filed: Feb. 8, 2016

(86) PCT No.: PCT/AU2016/050072
§ 371 (c)(1),
(2) Date: Aug. 9, 2017

(87) PCT Pub. No.: WO2016/127208
PCT Pub. Date: Aug. 18, 2016

(65) Prior Publication Data
US 2018/0026415 A1     Jan. 25, 2018

(30) Foreign Application Priority Data

Feb. 9, 2015  (GB) .................................. 1502109.0

(51) Int. Cl.
*H01S 3/04*   (2006.01)
*H01S 3/06*   (2006.01)
(Continued)

(52) U.S. Cl.
CPC .............. *H01S 3/0405* (2013.01); *C03C 3/04* (2013.01); *C03C 25/42* (2013.01);
(Continued)

(58) Field of Classification Search
None
See application file for complete search history.

(56) References Cited

U.S. PATENT DOCUMENTS 4,923,278 A * 5/1990 Kashyap .................. G02B 6/02
                                                 385/100
6,101,199 A    8/2000 Wang et al.
(Continued)

OTHER PUBLICATIONS

Written Opinion of the International Searching Authority dated Jun. 3, 2016, issued in corresponding International Application No. PCT/AU2016/050072 (9 pgs.).
(Continued)

*Primary Examiner* — Michelle R Connelly
(74) *Attorney, Agent, or Firm* — Finnegan, Henderson, Farabow, Garrett & Dunner LLP (57) ABSTRACT

An active optical fibre, including: a core; an inner cladding substantially surrounding the core, whereby the core and the inner cladding form an area configured to propagate pump radiation; an outer cladding comprised of at least a third material with at least a third refractive index substantially surrounding the inner cladding, the third refractive index being smaller than the second refractive index, whereby the outer cladding confines pump radiation to the core and the inner cladding; and a coating comprised of a thermally conductive material substantially surrounding the outer cladding, wherein the inner cladding is configured to reduce impact of spatial hole-burning on absorption of the pump radiation as the pump radiation propagates through the active optical fibre, and wherein the thermally conductive
(Continued)

material of the coating supports a reduced temperature increase between the area and an outer surface of the coating.

21 Claims, 3 Drawing Sheets

(51) Int. Cl.
  *H01S 3/067*  (2006.01)
  *G02B 6/02*  (2006.01)
  *C03C 25/42*  (2006.01)
  *G02B 6/036*  (2006.01)
  *C03C 3/04*  (2006.01)

(52) U.S. Cl.
  CPC ..... *G02B 6/02395* (2013.01); *G02B 6/03633* (2013.01); *H01S 3/067* (2013.01); *H01S 3/06716* (2013.01); *H01S 3/06733* (2013.01); *H01S 3/06754* (2013.01)

(56) References Cited

U.S. PATENT DOCUMENTS

| | | | | |
|---|---|---|---|---|
| 7,634,164 | B2* | 12/2009 | Farroni | G02B 6/024 385/123 |
| 2002/0181512 | A1* | 12/2002 | Wang | G02B 6/4204 372/6 |
| 2005/0271347 | A1* | 12/2005 | Kimball | C03B 37/01413 385/142 |
| 2006/0219673 | A1* | 10/2006 | Varnham | B23K 26/0734 219/121.6 |
| 2007/0002905 | A1 | 1/2007 | Budni et al. | |

OTHER PUBLICATIONS

PCT International Search Report dated Jun. 3, 2016, issued in corresponding International Application No. PCT/AU2016/050072 (5 pgs.).

Tsekmes, I.A., et al. "Thermal Conductivity of Polymeric Composites: A Review"; 2013 IEEE International Conference on Solid Dielectrics, Bologna, Italy, Jun. 30-Jul. 4, 2013 (5 pgs.).

European Patent Office, Communication enclosing the extended European Search Report including, pursuant to Rule 62 EPC, the supplementary European Search Report (Art. 153(7)) EPC) and the European Search Opinion issued in corresponding Application No. 16748478.1-1106, dated Oct. 25, 2018, 12 pages.

Tsekmes, I.A. et al. "Thermal Conductivity of Polymeric Composites: A Review", 2013 IEEE International Conference on Solid Dielectrics, Bologna, Italy, Jun. 30-Jul. 4, 2013, 4 pages.

* cited by examiner

ACTIVE OPTICAL FIBRE

CROSS REFERENCE TO RELATED APPLICATION

This application is the U.S. national stage application under 35 U.S.C. § 371 of International Application No. PCT/AU2016/050072, filed on Feb. 8, 2016, which claims priority to and the benefits of priority to GB Application No. 1502109.0, filed Feb. 9, 2015, the entire contents of which have been incorporated herein by reference.

TECHNICAL FIELD

The present invention relates to an active optical fibre including a core, an inner cladding, an outer cladding, and a coating comprised of a thermally conductive metal, graphite or other material substantially surrounding the outer cladding. Particularly, but not exclusively, the inner cladding is configured to reduce impact of spatial hole-burning on absorption of pump radiation as the pump radiation propagates through a length of the active optical fibre, and the thermally conductive metal, graphite or other material of the coating, such as Aluminium, supports a reduced temperature increase between an area including the core and the inner cladding of the optical fibre and an outer surface of the coating via the coating and the outer cladding.

BACKGROUND OF INVENTION

Currently, most existing active, double clad optical fibres utilise a low refractive index polymer cladding for coating the optical fibre. These existing double clad fibres have a core and an inner cladding, surrounding the core, for propagating radiation from a pump laser coupled in to the optical fibre, and an outer cladding, surrounding the inner cladding, for confining the pump radiation to the core and the inner cladding. The polymer cladding used in these double clad fibres is selected for its optical properties to allow a wide acceptance angle of incoming pump light; however, this polymer material generally degrades when exposed to high temperatures, such as those greater than 80° C., and has very poor thermal conductivity, such as around 0.18 W/m/K. Accordingly, there is a limitation on the level of pump power that can be coupled into such a double clad optical fibre without providing suitable cooling systems for the laser. For example, in some higher power applications, such as high power fibre amplifiers and lasers, that employ the above existing active, double clad optical fibre, cooling systems including thermo-electric coolers, water circulator and large thermal masses are used to cool the laser so as to not damage the active optical fibre; in particular, the thermally sensitive polymer cladding.

Figure 1:
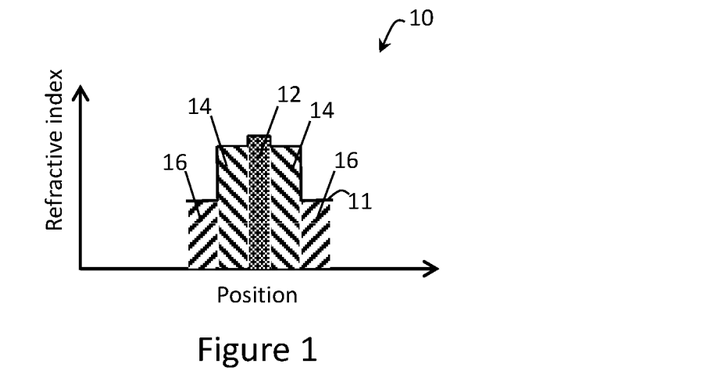
FIG. 1 is a graphical representation of the relative refractive indexes of the components of a prior art active optical fibre.

An example of a prior art active, double clad optical fibre is shown with respect to FIG. 1. As described, the core and the inner cladding of the prior art active, double clad optical fibre propagate the pump radiation therethrough, and the outer cladding confines the pump radiation to the core and the inner cladding. It will be appreciated by those persons skilled in the art that an active optical fibre includes a core that guides and enables light amplification by stimulated emission of radiation for a single mode or a multi-mode signal. The outer cladding confines the pump radiation by having a smaller refractive index than the inner cladding. FIG. 1 shows a graphical representation 10 of the relative refractive indexes of the components of the exemplary double clad optical fibre. Specifically, FIG. 1 shows a line 11 indicative of the respective refractive indexes of a central core 12, inner cladding 14, and an outer cladding 16 of the optical fibre, relative to their position in the fibre. Here, the outer cladding 16 consists of a polymer used for its optical properties to enable the guidance of pump radiation as well as to provide a physically protective coating to the optical fibre.

It can be seen from FIG. 1 that the core 12 is formed from a material with a first refractive index $n_1$, the inner cladding 14 is formed from a material with a second refractive index $n_2$ that is smaller than the first refractive index $n_1$, and the outer cladding 16 is formed from a polymer material with a third refractive index $n_3$ that is smaller again than the second refractive index $n_2$.

It will be appreciated by those persons skilled in the art that numerical aperture or NA of an optical fibre is given by the equation: $NA=\sqrt{n_1^2-n_2^2}$ where $n_1$ is a first refractive index and $n_2$ is a second refractive index. It will also be appreciated that numerical aperture can be related to the acceptance angle of the optical fibre by the equation: $NA=n*\sin(\theta)$ where n is the refractive index of the medium from which light is being launched. Typically, the medium is air with a refractive index equal to 1.

Turning back to FIG. 1, the acceptance aperture for receiving pump radiation from a laser coupled to the optical fibre is defined by an index difference between the second refractive index $n_2$ of the inner cladding 14 and the third refractive index $n_3$ of the outer cladding 16. As described, the index difference between the second refractive index $n_2$ and the third refractive index $n_3$ shown in FIG. 1 is relatively large and thus the acceptance aperture is also relatively large. For example, the inner cladding is pure silica with a refractive index of 1.45 and the outer cladding is a polymer coating with a refractive index of 1.373.

It will also be appreciated by those persons skilled in the art that for any wavelength dispersive medium the refractive index of this medium is dependent on the wavelength of incident light. Herein, any reference to refractive index relates to the operation at a wavelength of light of 1.064 micrometres. Nonetheless, it will also be appreciated that the reference wavelength is used for clarity purpose and does not limit the use of this wavelength within the invention. Indeed, it will be appreciated that the wavelength of operation of this invention can cover the entire spectrum of which an optical fibre is transparent.

In the prior art example shown in FIG. 1, the acceptance aperture of the optical fibre is determined, by the index difference between the second refractive index $n_2$ of the inner cladding 14 and the third refractive index $n_3$ of the outer cladding 16, to be 0.46 NA. This relatively large acceptance aperture of 0.46 NA enables a laser with a relatively low brightness to be coupled to the optical fibre. The polymer cladding used, however, generally degrades when exposed to high temperatures and has very poor thermal conductivity.

SUMMARY OF INVENTION

Accordingly, an aspect of the present invention provides an active optical fibre, including: a core comprised of at least a first material with at least a first refractive index; an inner cladding comprised of at least a second material with at least a second refractive index substantially surrounding the core, whereby the core and the inner cladding form an area configured to propagate pump radiation from a pump laser coupled to the optical fibre; an outer cladding comprised of at least a third material with at least a third refractive index substantially surrounding the inner cladding, the third refractive index being smaller than the second refractive index, whereby the outer cladding confines pump radiation from the pump laser to the core and the inner cladding; and a coating comprised of a thermally conductive metal, graphite or other material substantially surrounding the outer cladding, wherein the inner cladding is configured to reduce impact of spatial hole-burning on absorption of the pump radiation as the pump radiation propagates through a length of the active optical fibre, and wherein the thermally conductive metal, graphite or other material of the coating supports a reduced temperature increase between the area and an outer surface of the coating via the coating and the outer cladding.

Another aspect of the invention provides a laser system, including: a pump laser or pump laser array; an active optical fibre coupled to the pump laser or pump laser array, the active optical fibre including: a core comprised of at least a first material with at least a first refractive index; an inner cladding comprised of at least a second material with at least a second refractive index substantially surrounding the core, whereby the core and the inner cladding form an area configured to propagate pump radiation from the pump laser or pump laser array; an outer cladding comprised of at least a third material with a at least third refractive index substantially surrounding the inner cladding, the third refractive index being smaller than the second refractive index, whereby the outer cladding confines pump radiation from the pump laser or pump laser array to the core and the inner cladding; and a coating comprised of a thermally conductive metal, graphite or other material substantially surrounding the outer cladding, wherein the inner cladding is configured to reduce impact of spatial hole-burning on absorption of the pump radiation as the pump radiation propagates through a length of the active optical fibre; and a heat-sink coupled to the coating of the active optical fibre, wherein the thermally conductive metal, graphite or other material of the coating supports a reduced temperature increase between the area and the heat-sink via the coating and the outer cladding.

Preferably, the thermally conductive metal material includes, but is not limited to: Aluminium, Copper, Gold, Tin, or an alloy thereof, and the thermally conductive graphite material includes: graphite or a composite material comprised of graphite. It is also envisaged that multiple layers of the thermally conductive metal, graphite or other materials could be used to form the coating. These thermally conductive metal, graphite or other materials substantially surrounding the outer cladding have a small thermal resistance and hence reduce the temperature difference between the area and the outer surface of the coating. Also, the thermally conducting other material of the coating includes polymers impregnated with metals, nitrides, oxides, carbides or other materials to increase a thermal conductivity of the coating. That is, base polymers are impregnated with metals, nitrides, oxides, carbides or other materials to increase the thermal conductivity relative to the base polymers.

Further, in the aspect where the coating is coupled to a heat-sink for cooling the optical fibre, the thermally conductive metal, graphite or other material reduces the temperature difference between the area and the heat-sink. Accordingly, the active optical fibre can operate at an increased upper operating temperature with the area and the cladding layers of the optical fibre being less likely to be damaged whilst operating at high laser output power. The thermally conductive metal, graphite or other material of the coating also supports an increased operating temperature and/or increased operating temperature range of the optical fibre. For example, in some embodiments, the operating temperature is greater than 80° C. and is preferably around 200° C. Indeed, in certain envisaged high power laser applications, the operating temperature is greater than 300° C., and the thermally conductive metal, graphite or other material of the coating has a suitable thermal conductivity to conduct heat away from the core, inner cladding, and outer cladding of the optical fibre. For example, the coating has a thermal conductivity greater than 0.18 W/m/K; such as Aluminium, with a conductivity of around 237 W/m/K and a useful operating temperature range of up to 400° C. In another example, the thermally conductive other material (e.g. polymer) coating has a thermal conductivity greater than 0.5 W/m/K.

In an embodiment, the inner cladding has a symmetry breaking shape configured to reduce the impact of spatial hole-burning on absorption of the pump radiation as the pump radiation propagates through the length of the active optical fibre. In addition, the symmetry breaking shape is further configured to increase overlap of the pump radiation within the core along the length of the active optical fibre. In another embodiment, the inner cladding has an internal structure configured to reduce the impact of spatial hole-burning on absorption of the pump radiation as the pump radiation propagates through the length of the active optical fibre. In addition, the internal structure is further configured to increase overlap of the pump radiation within the core along the length of the active optical fibre.

Preferably, the symmetry breaking shape includes any one of: D-shape, convex polygon, petal arrangement, and an ellipse. For example, the convex polygon is an octagon. Alternatively, the inner cladding can have any combination of flat and curved sides that creates a convex shape and, indeed, some concave shapes can be manufactured and used as a symmetry breaking shape. Further examples of internal structures configured to increase overlap of the pump radiation within the core include any one of: one or more holes drilled into the inner cladding; an off-centre core; helical core; chiral core; stress rods or rods of other materials incorporated in the inner cladding; and micro-structure features.

In an embodiment, the first material includes rare earth doped silica glass. For example, the core is comprised of ytterbium doped material with a refractive index of 1.452. Also, in an embodiment, the second refractive index is smaller than the first refractive index.

In an embodiment, the core, inner cladding and/or the outer cladding is comprised of a material which includes any one of the following glasses: pure silica, silica doped with Germanium, Aluminium, Fluorine, Boron, or Phosphate, singular or a combination of any of the rare earths, etc., and so called soft glasses, such as InF, ZBLAN, Phosphates, Silicates, Germanates, Chalcogenides, Tellurides with a combination of any of the rare earths, etc. Further, it is envisaged that any glass material that is transparent to optical radiation could be incorporated into the active optical fibre.

For example, the second material includes germanium or aluminium doped silica and the third material includes pure silica so the third refractive index is smaller than the second refractive index. In another example, the second material includes pure silica and the third material includes fluorine-doped or fluorine/boron-doped silica so that the third refractive index is smaller than the second refractive index. In a more specific example, the second material is pure silica with a refractive index of 1.45 and the third material is Fluorine doped silica which is a glass structure that has been down-doped to have a refractive index of 1.43. It will be appreciated by those persons skilled in the art that Germanium or Aluminium doped silica is up-doped and has a higher refractive index than pure silica.

It will also be appreciated that the materials, such as the different types of doped silica, can be layered in the core, inner cladding and/or outer cladding of the active optical fibre. In one embodiment, the core is comprised of multiple materials with multiple refractive indexes. In addition, or in the alternative, the inner cladding is also comprised of multiple materials with multiple refractive indexes. In addition, or in the alternative, the outer cladding is also comprised of multiple materials with multiple refractive indexes. The third refractive index of any of the materials of the outer cladding, however, is still smaller than the second refractive index of any of the materials of the inner cladding so that the outer cladding still confines the pump radiation from the pump laser to the core and the inner cladding. Also, the inner cladding is still configured to increase overlap of the pump radiation within the core over the length of the active optical fibre.

In one embodiment, the active optical fibre includes one or more additional cladding layers of, for instance, silica glass between the outer cladding and the coating. In this embodiment, the one or more additional cladding layers provide additional mechanical strength to the active optical fibre and reduces mode-scrambling due to the coating.

Furthermore, in one embodiment, the thermally conductive metal, graphite or other material of the coating further supports an increased thermal load from the laser. In one embodiment, the thermally conductive metal, graphite or other material of the coating reduces the overall system size, weight and volume of the laser system through increased operating temperature range and hence increased cooling capacity for a given heat-sink size or weight and ambient temperature.

In one embodiment, the thermally conductive metal, graphite or other material of the coating provides that a multitude of high power lasers or fibre amplifiers can be attached to a single heat-sink structure with an aim to reduce the overall laser system size, weight and volume.

One embodiment of the invention provides that the thickness of the coating can be varied along the length of the active optical fibre and used to impart a temperature gradient across the length of the active optical fibre through the use of inductive or joule heating of this coating. Also, in another embodiment, variability in the thickness of the coating is further used to impart a stress gradient across the length of the active optical fibre through the use of inductive or joule heating of this coating.

One embodiment of the invention provides that the heat-sink is achieved through the electroforming or casting of a thermal mass directly to the coating, or to a spooled length of the active optical fibre.

In one embodiment, the coating allows the active optical fibre to be directly attached to the heat-sink with a low thermal resistance through the use of low melting point metals or metal alloys.

In one embodiment, the use of a sufficiently thick coating allows for a significant hydrogen barrier between the active optical fibre and the outside environment providing for a higher static fatigue and pull strength. Also, the use of a sufficiently thick coating allows for a distributed mode scrambling to occur across the length of the active optical fibre. Further, the use of sufficiently thick metal coating enables a degree of resistance to ionising radiation.

In one embodiment, the thickness of the coating is equal to or greater than 30 micrometres, in another embodiment the thickness is between 10-30 micrometres, and in a more preferred embodiment the thickness is between 1-10 micrometres. In yet another embodiment, the thickness of the coating is between 0.1-1 micrometres. It will be appreciated by those persons skilled in the art that other thickness ranges are envisaged as the thickness of the coating is determined by the desired function. For example, the minimum thickness required to allow for a significant hydrogen barrier between the active optical fibre and the outside environment is between 100-1000 nanometres, and the minimum thickness required for mode scrambling is between 1-10 micrometres.

In one embodiment, the use of a sufficiently thin coating supresses a distributed mode scrambling occurring across the length of the active optical fibre.

In one embodiment, the thickness of the coating is modulated radially or lengthwise in such a way so as to allow a distributed mode scrambling to occur across the length of the active optical fibre.

In one embodiment, the coating and coated active optical fibre are suitable for use in a vacuum environment.

In one embodiment of the laser system, the active optical fibre and the pump laser or pump laser array are remotely coupled via a passive optical fibre, and the active optical fibre includes a laser output aperture at a distal end of the active optical fibre. In this embodiment, the thermally conductive metal, graphite or other material of the coating supports a minimised distance between a proximal end of the active optical fibre coupled to the passive optical fibre and the laser output aperture. Also, the thermally conductive metal, graphite or other material of the coating supports a maximised distance between the active optical fibre and the pump laser or pump laser via the passive optical fibre. That is, the active optical fibre and the pump laser or pump laser array are remotely coupled and the increased operating temperature as well as increased thermal conductivity of the coating both allow the active optical fibre to be placed at a location remote to the pump laser or pump laser array and at a location close to the laser output aperture. Such a situation has the benefit of allowing the active fibre to be placed within space constrained environment whilst also minimising the distance the signal laser light must propagate within a waveguide of the laser system. Typically, the waveguide is a passive optical fibre but can also be an active optical fibre. In an example, the distance between the pump laser or pump laser array and the active optical fibre is between 1-10 metres. In another example, the distance is between 10-100 metres. In yet another example, the distance is between 100-10,000 metres. It will be appreciated by those persons skilled in the art that any separating distance between the active optical fibre and the pump laser or pump laser array can be employed by the system such that the separating distance is sufficient to thermally isolate the pump laser or pump laser array and the active optical fibre.

As described, the use of a high operating temperature thermally conductive coating (e.g. Aluminium, which can be up to 400° C.) enables a minimised cooling of the active optical fibre thus allowing the weight and size of the laser system to be distributed Also, the use of a high operating temperature thermally conductive coating preferentially allows the weight and size of the laser system to be concentrated at the pump laser or pump laser array thus minimising the weight and size of the active optical fibre situated near the laser output aperture. A secondary advantage to this laser system is, in one embodiment, the minimised propagation of laser light in the passive optical fibre situated after the active optical fibre, and thus the system serves to minimise impact of detrimental non-linear effects caused by propagation within this passive optical fibre.

In one embodiment, the thermally conductive metal, graphite or other material of the coating supports a minimised size, weight and cooling of the active optical fibre. Also, it will be appreciated that the pump laser or pump laser array and the active optical fibre can comprise two spatially separated modules with independent size, weight and cooling requirements, and the use of thermally conductive coating enables the minimised size, weight and cooling of the active optical fibre module. Further, the thermally conductive metal, graphite or other material of the coating provides the ability to spatially separate the active optical fibre module and the pump laser or pump laser array module such that the two can be considered two separate modules with independent size, weight and cooling requirements. As a result, the size of the active optical fibre module can be greatly reduced with the bulk of size, weight and cooling being placed at the pump laser module. Such a configuration allows the length between the laser gain and laser output aperture to be minimised and thus minimise the effects of nonlinearity on the propagating signal light and also enable the active optical fibre module to be a minimum in size, weight and require only minimal cooling.

In another embodiment, the system further includes a cascade of pump modules including the pump laser and the pump laser array, whereby one or more of the pump modules include the active optical fibre. Thus, the thermally conductive metal, graphite or other material of the coating in the active optical fibre of the pump modules enables high operating temperature and increased thermal load as well as a distributed size, weight and cooling requirement of the pump modules.

BRIEF DESCRIPTION OF DRAWINGS

In order that the invention can be more clearly understood, embodiments of the invention will now be described with reference to the accompanying drawings, in which.

DETAILED DESCRIPTION

Figure 2:
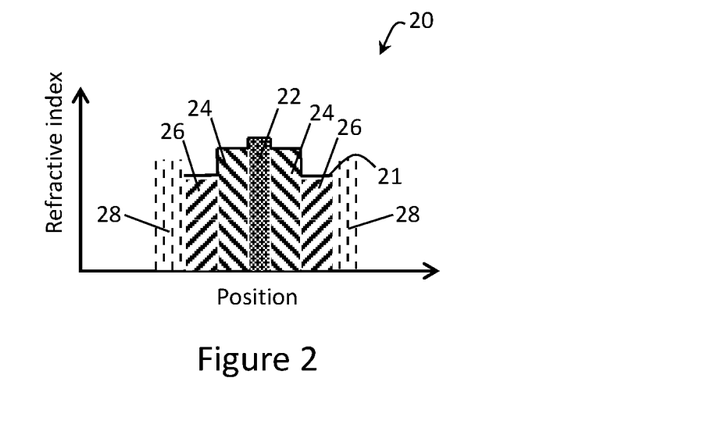
FIG. 2 is a graphical representation of a relative refractive indexes of an active optical fibre according to an embodiment of the present invention.
Figure 3:
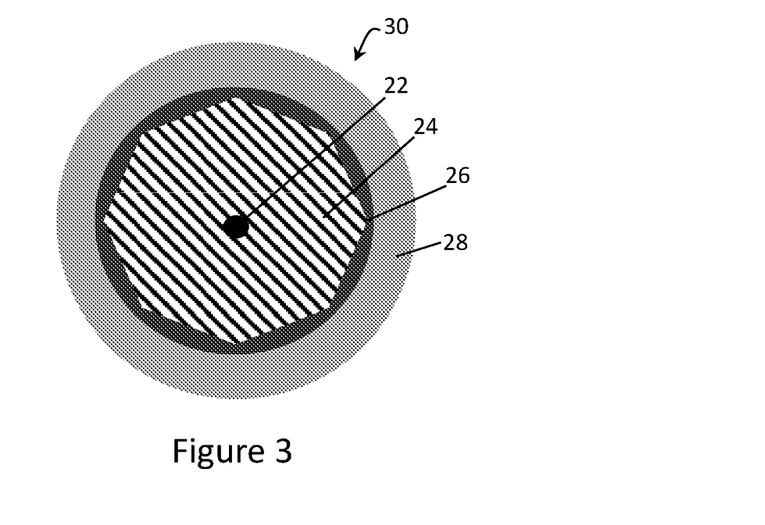
FIG. 3 is a cross-sectional view of an active optical fibre according to an embodiment of the present invention.

According to an embodiment of the present invention, there is provided an active optical fibre 30, as shown in FIG. 3, with relative refractive indexes of components of the active optical fibre 30 shown in the graphical representation 20 of the active optical fibre 30. Indeed, in FIG. 2, it can be seen that the active optical fibre 30 includes components having different refractive indexes shown by the line 21 relative to their position in the optical fibre 30.

The active optical fibre 30 includes a central core 22 comprised of a first material with a first refractive index. For example, in an embodiment, the first material is Ytterbium doped silica material with a refractive index of 1.452. Immediately surrounding the core 22 is an inner cladding 24 comprised of a second material with a second refractive index. In the embodiment, the second material is pure silica with a refractive index of 1.45. The core 22 and the inner cladding 24 form an area configured to propagate pump radiation from a pump laser (not shown) coupled to the optical fibre 30. As described, it will be appreciated by those persons skilled in the art that the core, inner cladding and outer cladding may each include one or more layers of refractive indexes, whilst still maintaining their primary functions.

It can be seen from FIG. 3 that the inner cladding 24 is shaped in an octagon shape to guide the pump radiation as it propagates therethrough. As described, the inner cladding 24 is configured to reduce impact of spatial hole-burning on absorption of the pump radiation as the pump radiation propagates through a length of the active optical fibre 30. Also, as described, it will be appreciated by those persons skilled in the art that other symmetry breaking shapes or features of the inner cladding 24 are used to enhance the absorption of the pump radiation as it propagates the length of the optical fibre 30. Indeed, any shape other than a circle can be used to break symmetry of the propagating pump radiation. Further, an off-centred core in a circular inner cladding could be also used to break symmetry of the propagating pump radiation. In this embodiment, the inner cladding 24 is octagon shaped to increase overlap of the pump radiation within the core 22 along the length of the active optical fibre 30.

The area formed from the core 22 and the inner cladding 24 propagates pump radiation from a laser (not shown) coupled to the optical fibre 30. The optical fibre 30 also includes an outer cladding 26 comprised of a third material with a third refractive index, which substantially surrounds the inner cladding 24. The outer cladding 26 confines the pump radiation from the laser to the core 22 and the inner cladding 24, or a portion thereof, by virtue of its smaller refractive index than the inner cladding 24. For instance, in an embodiment, the outer cladding 26 is Fluorine doped silica with a refractive index of 1.43 that is smaller than the second refractive index of pure silica of 1.45.

Also, a section of the optical fibre 30 having an acceptance aperture for receiving the pump radiation from the pump laser coupled thereto is defined by an index difference between the second refractive index of the second material and the third refractive index of the third material. Here, the acceptance aperture is equal to or greater than that of the pump source.

Moreover, the active optical fibre 30 of the embodiment further includes a coating 28 comprised of a thermally conductive metal, graphite or other material, such as aluminium, which substantially surrounds the outer cladding 26. The thermally conductive metal, graphite or other material of the coating 28 supports a reduced temperature increase between the area configured to propagate pump radiation and an outside surface of the coating 28 via the coating 28 itself and the outer cladding 26. That is, in an embodiment, the coating is aluminium and has a thermal conductivity of 237 W/m/K and a nominal operating temperature range of up to 400° C. It will be appreciated by those persons skilled in the art that other thermally conductive coating materials are envisaged; such as gold, which has a thermal conductivity of 318 W/m/K and an operating temperature of up to 700° C. Accordingly, the high thermal conductivity of the coating 28 supports the reduced temperature increase between the area configured to propagate pump radiation and the outside surface of the coating 28.

As described, in an embodiment, the active optical fibre 30 is coupled to a heat-sink (not shown) via the coating 28. In this embodiment, the thermally conductive metal, graphite or other material of the coating 28, such as Aluminium, supports a reduced temperature increase between the area configured to propagate pump radiation and the heat-sink via the coating 28 and the outer cladding 26.

In addition, FIG. 3 shows the relative dimension of the components of the active optical fibre 30. Specifically, the Ytterbium doped silica core 22 of the embodiment shown in FIG. 3 has a diameter of approximately 20 micrometres (0.075 NA), the octagon shaped silica inner cladding 24 has a diameter of 200 micrometres (0.23 NA), the Fluorine doped circular outer cladding has a diameter of 230 micrometres, and the Aluminium metal cladding has a diameter of 320 micrometres. In another embodiment, the active optical fibre 30 has the following dimensions for the respective diameters: core—20 micrometres; inner cladding—400 micrometres; outer cladding—440 micrometres; coating 460 micrometres.

Figure 4:
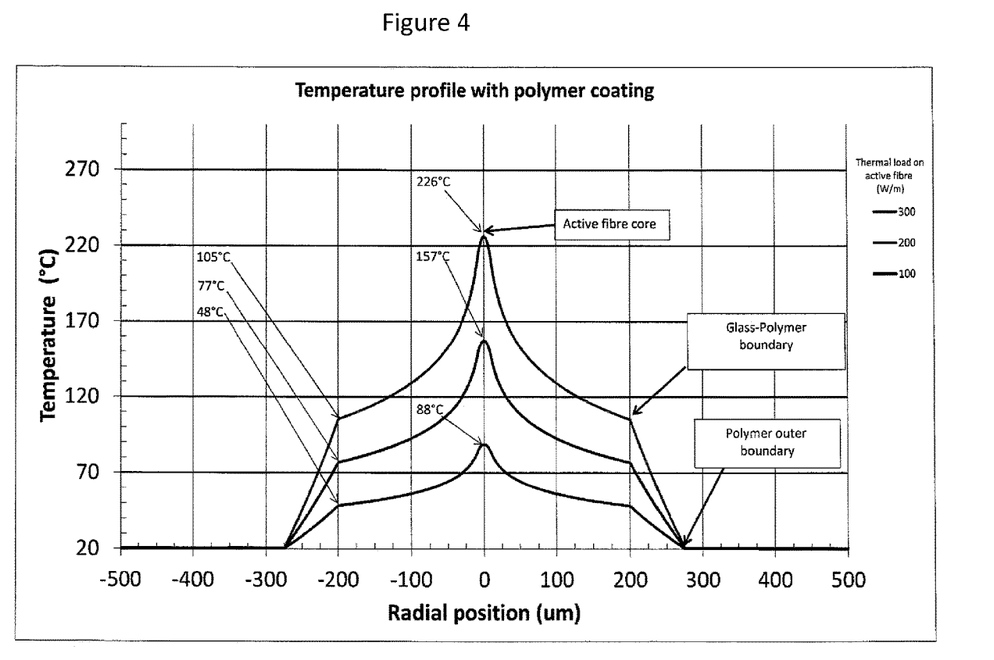
FIG. 4 is a graphical representation of the determined temperatures of the components of a prior art active optical fibre, in use.
Figure 5:
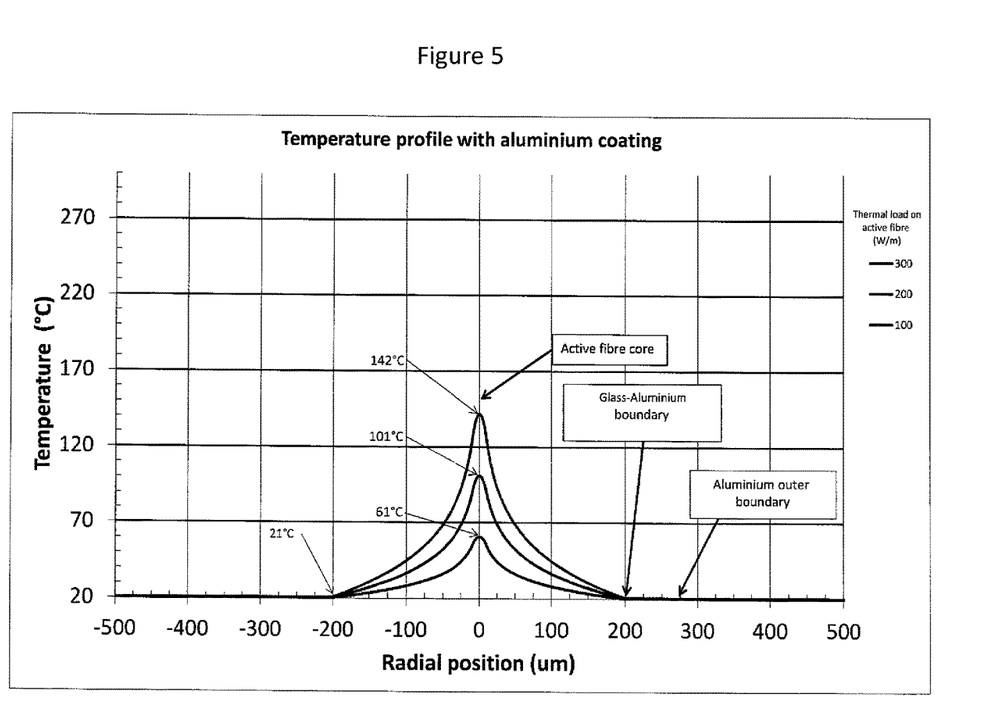
FIG. 5 is a graphical representation of the determined temperatures of the components of an active optical fibre according to an embodiment of the present invention, in use.

In another example shown in FIGS. 4 and 5, graphical representations of the calculated temperatures, using finite element modelling software, of the components of the prior art active optical fibre and the active optical fibre 30 of the embodiment in use are shown, respectively. FIG. 4 shows the temperatures being calculated at the core 12 of the optical fibre, at the boundary between the inner cladding 14 and the polymer outer cladding 16, and at the outer surface of the polymer outer cladding 16. FIG. 5 shows the temperatures being calculated at the core 22 of the optical fibre 30, at the boundary between the outer cladding 26 and the coating 28 of the optical fibre 20, and at the outer surface of the coating 28. In both Figures, the temperature profiles are calculated for 100, 200, and 300 W/m thermal loads applied to the optical fibres. With reference to a 100 W/m thermal load being applied, FIG. 4 shows the core 12 temperature of the prior art active optical fibre being 88° C. while FIG. 5 shows the core 22 temperature of the active optical fibre 30 being 61° C.

Accordingly, the thermally conductive coating 28 acts as a low thermal resistance heat-sink to reduce the operating temperature of the core 22 and the inner cladding 24 of the active optical fibre 30—thus the area of the active optical fibre 30—and thus enabling the active optical fibre 30 to be operated with a higher thermal load before detrimental effects become prominent. Furthermore, the coating 28 also enables a much lower temperature difference (ΔT) at the transition between the core 22, inner cladding 24 and outer cladding 26 of the fibre 30 as it acts as both a heat-sink and an interstitial material serving to reduce thermal resistance between the area and the heat sinking structure. The active optical fibre 30 in the embodiment thus has a wider temperature operating range. Finally, the active optical fibre 30 with the coating 28 provides for size, volume and weight savings for a laser system as, for instance, heavy heat-sinks are not required to be used in conjunction with the coating 28.

It is to be understood that various alterations, additions and/or modifications may be made to the parts previously described without departing from the ambit of the present invention.

It is to be understood that, if any of the prior art is referred to herein, such reference does not constitute an admission that the prior art forms a part of the common general knowledge in the art in any country.

In the claims which follow, and in the preceding description of the invention, except where the context requires otherwise due to express language or necessary implication, the word "comprise" or variations such as "comprises" or "comprising", is used in an inclusive sense, i.e. to specify the presence of the stated features but not to preclude the presence or addition of further features in various embodiments of the invention.

The claims defining the invention are as follows:

1. An active optical fibre, including:
   a core comprised of at least a first material with at least a first refractive index;
   an inner cladding comprised of at least a second material with at least a second refractive index substantially surrounding the core, whereby the core and the inner cladding form an area configured to propagate pump radiation from a pump laser coupled to the optical fibre when in use;
   an outer cladding comprised of at least a third material with at least a third refractive index substantially surrounding the inner cladding, the third refractive index being smaller than the second refractive index, whereby the outer cladding confines pump radiation from the pump laser to the core and the inner cladding; and
   a coating comprised of a thermally conductive metal, graphite or other thermally conductive material substantially surrounding the outer cladding,
   wherein the inner cladding has a symmetry breaking shape configured to reduce impact of spatial hole-burning on absorption of the pump radiation as the pump radiation propagates through a length of the active optical fibre, and
   wherein the thermally conductive metal, graphite or other thermally conductive material of the coating supports a reduced temperature increase between the area and an outer surface of the coating via the coating and supports an increased operating temperature of the area configured to propagate pump radiation, and wherein the thickness of the coating is between 0.1-30 μm.

2. An active optical fibre of claim 1, wherein the thermally conductive metal material includes: Aluminium, Copper, Gold, Tin, or an alloy thereof; and the thermally conductive graphite material includes: graphite or a composite material comprised of graphite; and the thermally conductive other material of the coating includes polymers impregnated with metals, nitrides, oxides, carbides or other materials to increase a thermal conductivity of the coating.

3. An active optical fibre of claim 1, wherein the symmetry breaking shape is further configured to increase overlap of the pump radiation within the core along the length of the active optical fibre as compared to a circular cladding.

4. An active optical fibre of claim 1, wherein the inner cladding has an internal structure configured to reduce the impact of spatial hole-burning on absorption of the pump radiation as the pump radiation propagates through the length of the active optical fibre.

5. An active optical fibre of claim 4, wherein the internal structure is further configured to increase overlap of the pump radiation within the core along the length of the active optical fibre.

6. An active optical fibre of claim 1, wherein the symmetry breaking shape includes any one of: a D-shape, convex polygon, petal arrangement, and an ellipse.

7. An active optical fibre of claim 1, wherein the thermally conductive metal, graphite or thermally conductive other material of the coating further supports an increased operating temperature and/or increased operating temperature range of the optical fibre.

8. An active optical fibre of claim 7, wherein the operating temperature is greater than 80° C., and/or below the melting point of the coating.

9. An active optical fibre of claim 8, wherein the thermally conductive metal, graphite or thermally conductive other material of the coating further supports an increased thermal load from the laser.

10. An active optical fibre of claim 1, wherein the thermally conductive metal, graphite or other material of the coating has a thermal conductivity greater than 0.18 W/m/K or greater than 0.5 W/m/K.

11. An active optical fibre of claim 10, wherein the thermally conductive metal or graphite material of the coating has a thermal conductivity of 109 W/m/K.

12. An active optical fibre of claim 1, wherein the thickness is 1-10 μm.

13. An active optical fibre of claim 1, wherein the thickness is 10-30 μm.

14. An active optical fibre of claim 1, wherein the thickness is 0.1-1 μm.

15. An active optical fibre of claim 1, wherein the thickness is modulated radially or lengthwise.

16. A laser system, including:
a pump laser or pump laser array;
an active optical fibre coupled to the pump laser or pump laser array, the active optical fibre including:
a core comprised of at least a first material with at least a first refractive index;
an inner cladding comprised of at least a second material with at least a second refractive index substantially surrounding the core, whereby the core and the inner cladding form an area configured to propagate pump radiation from the pump laser or pump laser array when in use;
an outer cladding comprised of at least a third material with at least a third refractive index substantially surrounding the inner cladding, the third refractive index being smaller than the second refractive index, whereby the outer cladding confines pump radiation from the pump laser or pump laser array to the core and the inner cladding; and
a coating comprised of a thermally conductive metal, graphite or thermally conductive other material substantially surrounding the outer cladding,
wherein the inner cladding has a symmetry breaking shape configured to reduce impact of spatial hole-burning on absorption of the pump radiation as the pump radiation propagates through a length of the active optical fibre as compared to a circular cladding,
wherein the thermally conductive metal, graphite, or thermally conductive other material of the coating supports a reduced temperature increase between the area and an outer surface of the outer cladding via the coating and the outer cladding and supports an increased operating temperature of the area configured to propagate pump radiation, wherein thickness of the coating is between 0.1-30 μm, and wherein the coating supports a minimised size, weight, and cooling of the active optical fibre so as to minimise size and weight of the laser system.

17. A laser system of claim 16, wherein the active optical fibre and the pump laser or pump laser array are remotely coupled via a passive optical fibre, and the active optical fibre includes a laser output aperture at a distal end of the active optical fibre.

18. A laser system of claim 17, wherein the thermally conductive metal, graphite or thermally conductive other material of the coating supports a minimised distance between a proximal end of the active optical fibre coupled to the passive optical fibre and the laser output aperture; and/or the thermally conductive metal, graphite or thermally conductive other material of the coating supports a maximised distance between the active optical fibre and the pump laser or pump laser array via the passive optical fibre.

19. A laser system of claim 18, wherein the distance between the pump laser or pump laser array and the active optical fibre is between 1-10 metres, or 10-100 metres, or 100-10,000 metres.

20. A laser system of claim 16, wherein the coating allows for the weight and size of the laser system to be concentrated at the pump laser or pump laser array of the laser system.

21. A laser system of claim 16, wherein the coating acts as a low thermal resistance heat sink so that heat sinks are not required to be used by the laser system in conjunction with the coating.

* * * * *